(12) United States Patent
Wong et al.

(10) Patent No.: US 11,879,395 B2
(45) Date of Patent: Jan. 23, 2024

(54) NOISE ATTENUATION IN AN ENGINE NACELLE

(71) Applicant: THE BOEING COMPANY, Chicago, IL (US)

(72) Inventors: Jackie Wong, Chicago, IL (US); Michael Bailey, Chicago, IL (US); Rajan Khatri, Chicago, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/728,788

(22) Filed: Apr. 25, 2022

(65) Prior Publication Data

US 2022/0349347 A1 Nov. 3, 2022

Related U.S. Application Data

(60) Provisional application No. 63/183,481, filed on May 3, 2021.

(51) Int. Cl.
*F02C 7/24* (2006.01)
*B64D 29/00* (2006.01)

(52) U.S. Cl.
CPC ............... *F02C 7/24* (2013.01); *B64D 29/00* (2013.01); *F05D 2260/96* (2013.01)

(58) Field of Classification Search
CPC ... F02C 7/24; F02C 7/20; B64D 29/00; B64D 2033/0206; F05D 2260/96; F05D 2260/963
USPC .......................................................... 415/119
See application file for complete search history.

(56) References Cited

U.S. PATENT DOCUMENTS

| 4,235,303 | A | * | 11/1980 | Dhoore | ................... | B64D 33/02 428/6 |
| 9,604,438 | B2 | | 3/2017 | Lumbab et al. | | |
| 10,294,867 | B2 | | 5/2019 | Lumbab et al. | | |
| 2002/0064453 | A1 | * | 5/2002 | Tse | ......................... | F02K 1/386 415/119 |
| 2017/0328281 | A1 | * | 11/2017 | Pretty | ..................... | F02K 1/827 |
| 2020/0339243 | A1 | * | 10/2020 | Bouillon | ................. | F02C 7/045 |

* cited by examiner

*Primary Examiner* — Yi-Kai Wang
(74) *Attorney, Agent, or Firm* — Patterson + Sheridan, LLP (57) ABSTRACT

Certain aspects of the present disclosure provide a nacelle for an engine, including a plurality of acoustic fairing assemblies disposed within an aft fan duct of the nacelle, wherein each acoustic fairing assembly of the plurality of acoustic fairing assemblies comprises: a fairing body comprising a plurality of acoustic cells; and a fairing face sheet comprising a plurality of perforations and configured to be attached to the fairing body.

20 Claims, 8 Drawing Sheets

NOISE ATTENUATION IN AN ENGINE NACELLE

CROSS-REFERENCE TO RELATED APPLICATION

This application claims the benefit of and priority to U.S. Provisional Patent Application No. 63/183,481, filed on May 3, 2021, the entire contents of which are incorporated herein by reference.

INTRODUCTION

Aspects of the present disclosure generally relate to noise attenuation, and, more particularly, to methods and apparatuses for attenuating noise in an engine nacelle.

The operation of aircraft for personal and commercial activity is an indispensable part of modern life. However, as aircraft operations increase, so too do certain undesirable externalities, such as increased noise along flight routes and especially around airports. A primary producer of noise in aircraft operations is aircraft engines.

Accordingly, there is a need for noise reduction techniques to reduce the noise created by flight operations, especially with respect to aircraft engines.

SUMMARY

Certain embodiments provide a nacelle for an engine including a plurality of acoustic fairings disposed within an aft fan duct of the nacelle, wherein each acoustic fairing of the plurality of acoustic fairings includes: a fairing body including a plurality of acoustic cells; and a fairing face sheet including a plurality of perforations and configured to be attached to the fairing body.

In another embodiment, an aircraft includes a nacelle for an engine including a plurality of acoustic fairings disposed within an aft fan duct of the nacelle, wherein each acoustic fairing of the plurality of acoustic fairings includes: a fairing body including a plurality of acoustic cells; and a fairing face sheet including a plurality of perforations and configured to be attached to the fairing body.

In another embodiment, a method of manufacturing includes installing a nacelle for an engine including a plurality of acoustic fairings disposed within an aft fan duct of the nacelle, wherein each acoustic fairing of the plurality of acoustic fairings includes: a fairing body including a plurality of acoustic cells; and a fairing face sheet including a plurality of perforations and configured to be attached to the fairing body.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide improved acoustic structures for aircraft engines, and in particular, acoustically active fairing assemblies located within a fan duct of an engine nacelle.

In various aspects, an engine nacelle may include an aft fan duct assembly that may be integral with a reverse thrusting system of the engine. In order to improve serviceability, the aft duct portion may be constructed in two mirrored sub-assemblies that attach to form a generally barrel-shaped aft fan duct assembly. The two mirrored sub-assemblies attach at a bifurcation radius, which is a transition from the "barrel shape" around the aft fan duct assembly, to flat, vertical surfaces where the two mirrored sub-assemblies meet to seal against one another. Each sub-assembly may include acoustic fairing assemblies generally arranged vertically and configured to provide attachment support between the nacelle assembly and the aircraft (e.g., to a wing pylon) as well as to support an inner barrel assembly mounted coaxially with the engine.

In various aspects, the acoustic fairing assemblies, also referred to hereafter as acoustic fairings, comprise fairing bodies and fairing face sheets with acoustic features that abate noise created by the engine. For example, the fairing bodies may include a plurality of acoustic cells, which are shaped to act as acoustic reactive cavities. The fairing face sheets may include one or more patterns or zones of perforations configured to resist acoustic pressure in the acoustic cells. When assembled together, the fairing bodies and perforated fairing face sheets are configured to generate destructive interference of sound waves inside the nacelle, which mitigates sounds created by the engine.

The various acoustic fairing assemblies described herein may be manufactured using various materials and techniques. In some embodiments, for example, aspects of fairing assemblies may be machined, cast, forged, or created using additive manufacturing techniques.

Beneficially, the acoustic fairing assemblies described herein provide further sound mitigation surfaces within a nacelle, which reduce the overall sound signature of an aircraft engine. Moreover, the acoustic fairing assemblies may perform dual functions as both lightweight structural members and sound mitigation structures. Reduced sound from an aircraft engine assembly allows for increased aircraft operations, quieter aircraft operations, and reduced exposure to aircraft noise for bystanders, surrounding communities, and residential neighborhoods.

Example Aspects of a Thrust Reversing System

Figures 1A, 1B:
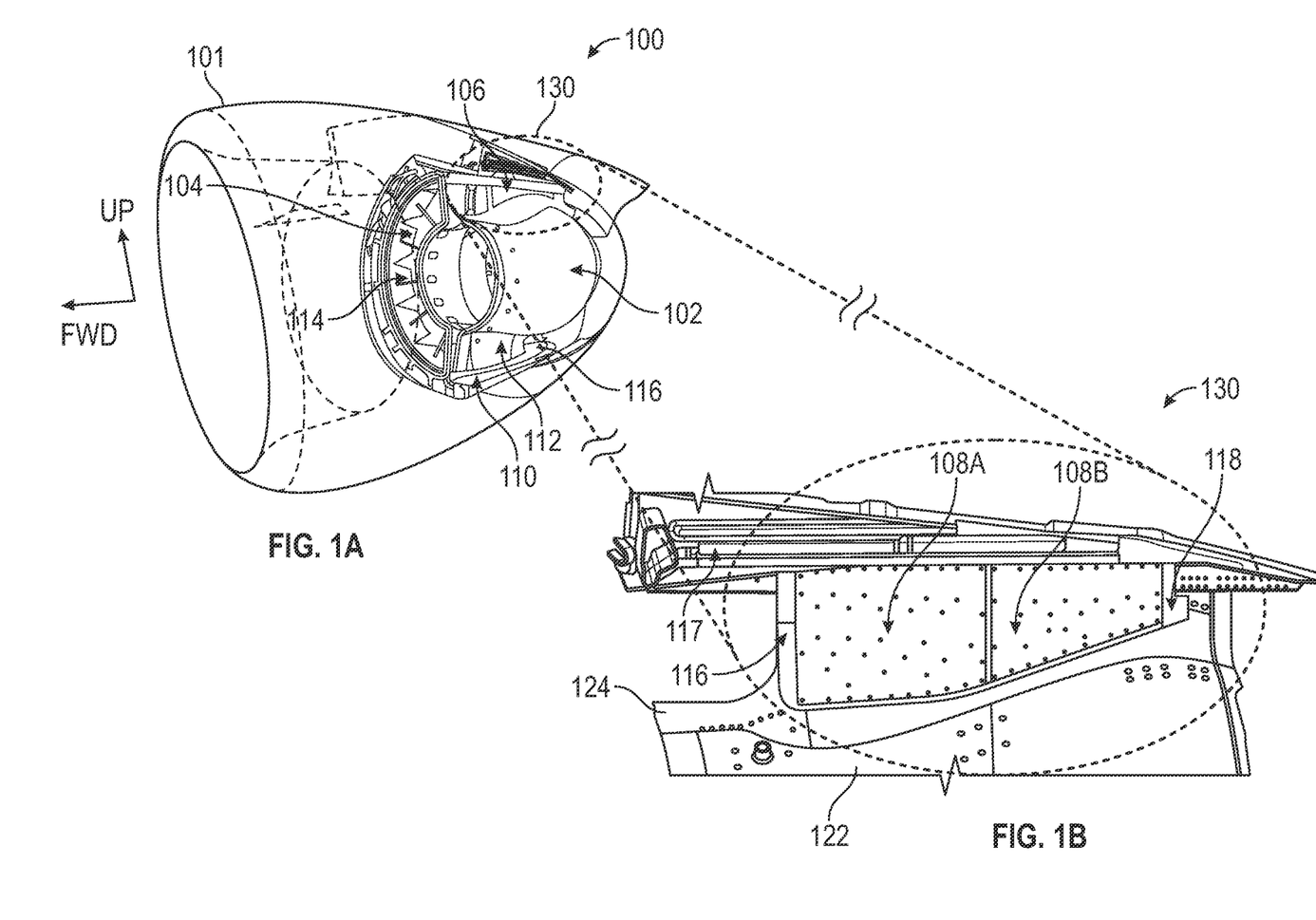
FIGS. 1A and 1B depict aspects of a thrust reversing system within an aft fan duct assembly of an aircraft engine.

FIGS. 1A and 1B depict aspects of a thrust reversing system within an aft fan duct assembly of an aircraft engine assembly 100.

In particular, the thrust reversing system is generally located in the aft portion of the engine assembly 100 and forms part of an aft fan duct assembly of the engine assembly 100 and more generally part of nacelle 101.

The thrust reversing system includes a plurality of blocker doors 114 configured to block the duct formed between the inner fan duct wall 102 and outer fan duct wall 104.

The thrust reversing system may generally be configured as two sub-assemblies that connect to form the generally barrel-shaped structures of the aft portion of the nacelle as well as the inner barrel formed by inner fan duct wall 102.

The thrust reversing system further includes a plurality of acoustic fairing assemblies in bifurcation areas, including an upper acoustic fairing assembly 106 in an upper bifurcation area and a lower acoustic fairing assembly 112 in a lower bifurcation area. Generally, upper acoustic fairing assembly 106 is connected to a hinge beam 117 while lower acoustic fairing assembly 112 is connected to a latch beam 110. In some embodiments, acoustic fairing assemblies 106 and 112 are added as bolt-in assemblies to an existing thrust-reversing system. Further, while certain depicted embodiments relate to fairing assemblies located in bifurcation areas of fan ducts within engine nacelles, other embodiments may include such fairing assemblies located in other parts of an engine and/or an engine nacelle.

The cutout portion 130 shows further details of upper acoustic fairing assembly 106, which includes a forward fairing assembly 108A including a leading edge 116 and a rear fairing assembly 108B including a trailing edge 118. Note that while upper acoustic fairing assembly 106 is depicted as comprising two fairing assemblies 108A and 108B in this example, in other examples, different numbers fairing assemblies may be used. Upper acoustic fairing assembly 106, including fairing assemblies 108A and 108B, is generally connected between a radius fitting 124, which is connected to inner fan duct wall 102, and to a hinge beam 117. Further, in the depicted embodiment, inner fan duct wall 102 may include an acoustic treatment, such as an acoustic panel 122.

Example Aspects of a Lower Acoustic Fairing Assembly

Figure 2:
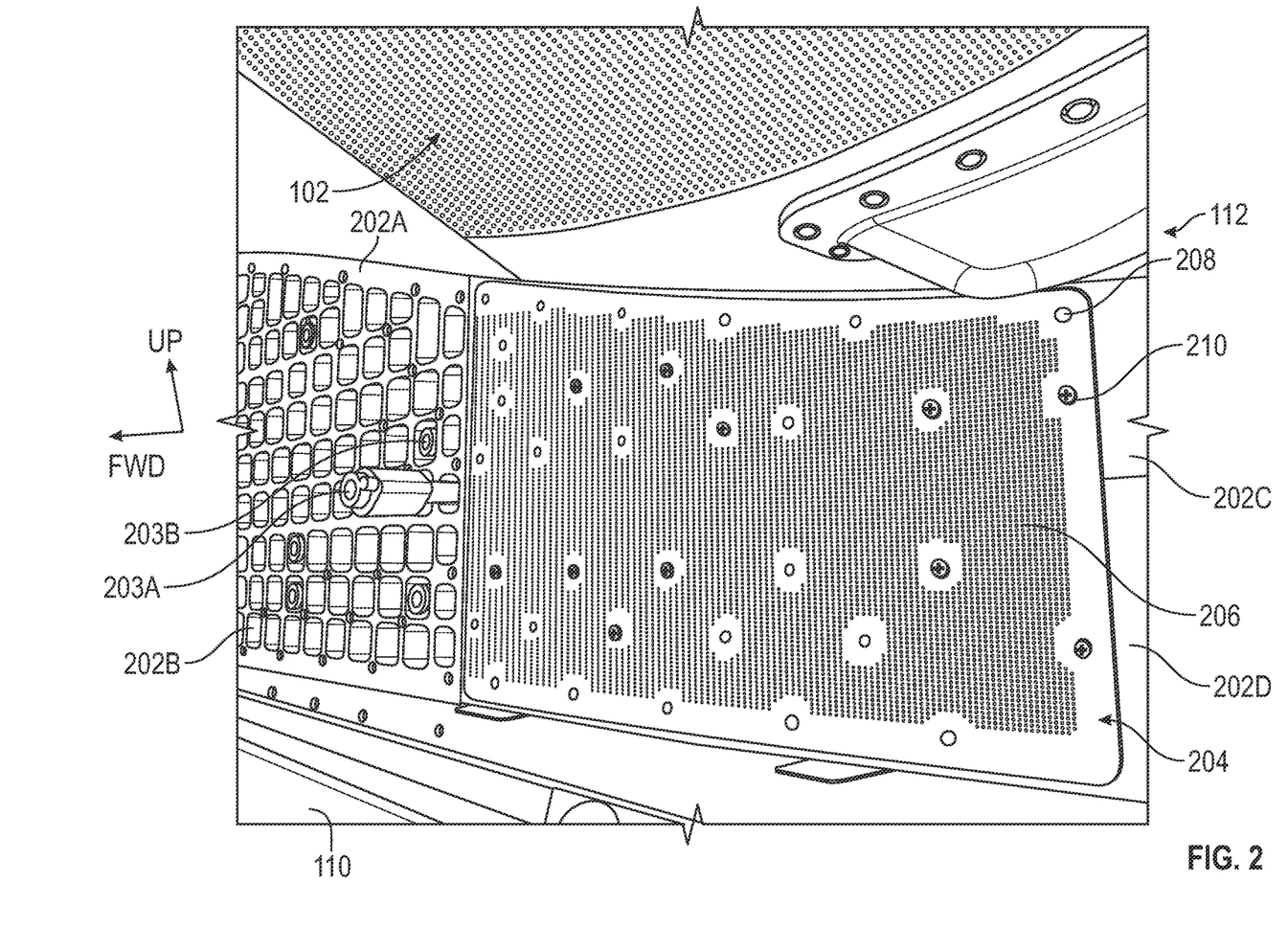
FIG. 2 depicts aspects of a lower acoustic fairing assembly in a lower bifurcation area.

FIG. 2 depicts aspects of a lower acoustic fairing assembly 112 in a lower bifurcation area located between an inner fan duct wall 102 and a latch beam 110.

In the depicted example, the lower acoustic fairing assembly 112 includes four fairing bodies, 202A-D. In FIG. 2, fairing bodies 202A and 202B are depicted without fairing face sheets attached, and fairing bodies 202C and 202D are depicted with a single fairing face sheet 204 with perforations 206 attached via fasteners 210 through attachment holes 208.

In some embodiments, fairing bodies may include mounting adapters configured to fit within the acoustic cavities (e.g., 212). For example, mounting adapter 203A is depicted aligned with, but not yet installed within, fairing body 202A. Mounting adapter 203B is depicted installed within an acoustic cavity of fairing body 202A. Mounting adapters, such as 203A and 203B allow for providing mounting apertures (e.g., threaded bores) to accept fasteners (e.g., 210) that retain, for example, a fairing face sheet, such as 204.

Figure 3A:
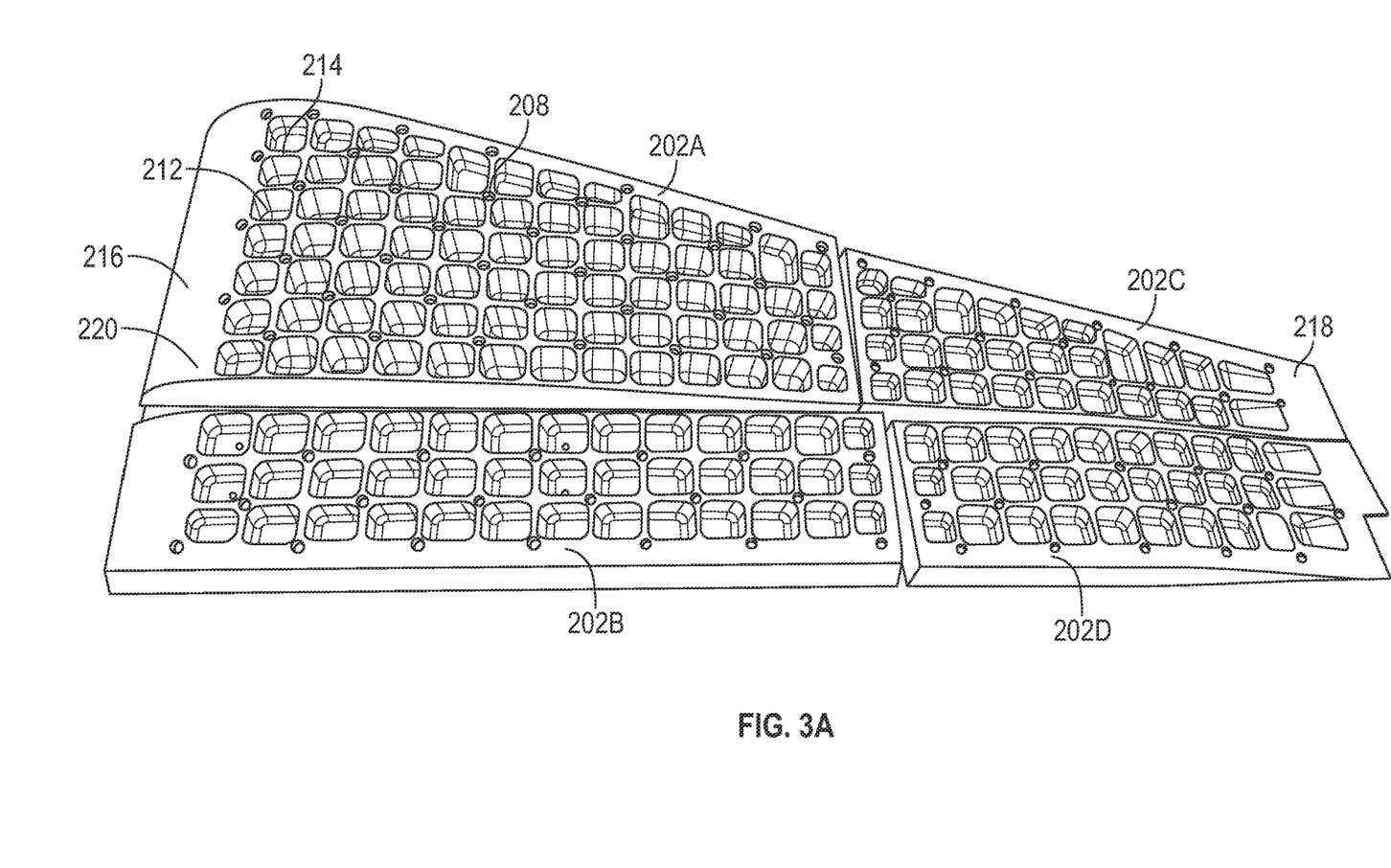
FIGS. 3A-3B depict further aspects of a lower acoustic fairing assembly.
Figure 3B:
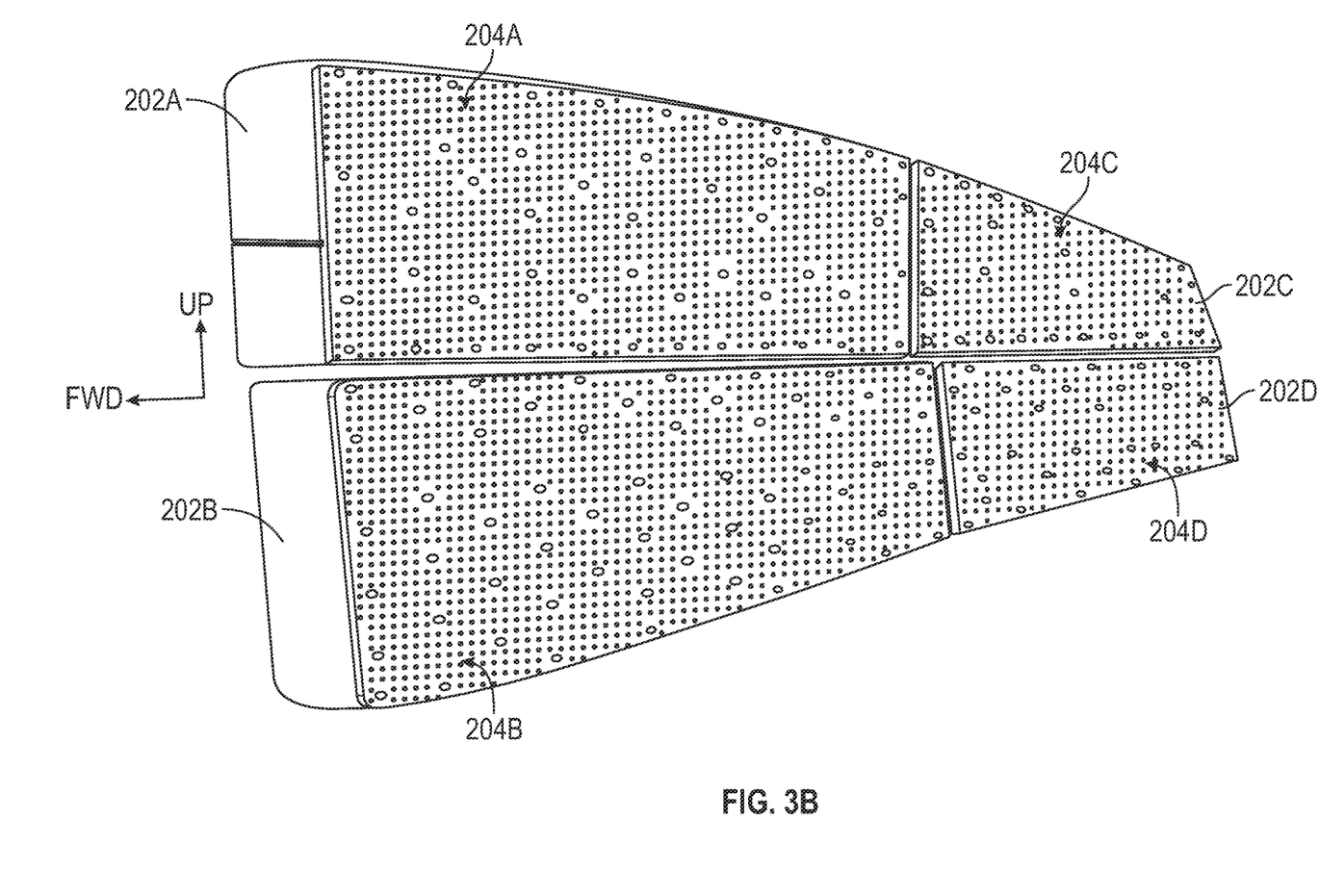

FIGS. 3A-3B depict further aspects of a lower acoustic fairing assembly.

In particular, FIG. 3A depicts fairing bodies 202A-D, which each include a plurality of cavities (e.g., 212). Generally, the cavities are defined by walls (e.g., 214). Note that while the depicted embodiment depicts cavities that generally have four walls, any number of walls and shapes of the cavities can generally be used.

Cavities 212 and walls 214 generally form acoustic cells, which may be tuned to perform sound cancelling and mitigation when combined with a face sheet, such as depicted in FIG. 3B. In some cases, the depth of an acoustic cell may be deeper than the widest extent of the opening of the acoustic cell in order to provide improved acoustic performance. However, as depicted in the figure, this arrangement may not always be possible.

Though not depicted in FIG. 3A, in some embodiments, one or more acoustic cells may include holes or other apertures in walls between cells, to further tune the acoustic performance. In other embodiments, walls may be angled relative to a cavity opening (e.g., so that the cross-section of the cavity changes along the depth), or the walls may be of a complex or non-linear geometry, to further tune the acoustic performance.

In some cases, the intersection of walls may include a hole 208 or other aperture for a fastener, such as a screw. The holes may allow for fastening a face sheet to the fairing body, as well as for fastening the fairing body to other aspects of an acoustic fairing assembly. Depending on the material of fairing bodies 202A-D, some holes (e.g., 208) may further include an insert for interfacing with a fastener.

Fairing bodies 202A and 202B include a leading edge 216, which is generally presented to the direction of flow of air through the nacelle, and thus leading edge 216 may include an aerodynamic surface to reduce drag. Note that because fairing bodies 202A and 202B would be arranged on one side of an engine, e.g., the right side or left side, the leading edge aerodynamic surface may not be symmetric between the front (facing the page) and back of the fairing bodies or between the top and bottom of the fairing bodies.

Fairing bodies 202C and 202D include a trailing edge 218. In this example, the trailing edge 218 is significantly thinner than the leading edge as the entire acoustic fairing assembly may be shaped in an aerodynamic fashion to reduce drag.

Fairing bodies 202A-D may include recessed portions (e.g., 220), or ledges, offset from the outer perimeter of the fairing, which allow for fitting fairing top sheets (as depicted in FIG. 3B) in a flush manner, which beneficially reduces drag as air passes through an engine.

In the depicted embodiment, fairing bodies 202A-D are formed as separate pieces of an acoustic fairing assembly in order to allow for expansion and contraction under different thermal conditions or under different vibration conditions without warping or breaking the acoustic fairing assembly, or otherwise causing unwanted aerodynamic effects. Further, fairing assemblies including multiple separate fairing bodies may generally be easier to install and maintain. In other embodiments, an acoustic fairing assembly may include more or fewer fairing bodies, and the fairing bodies may generally be different shapes depending on, for example, engine geometries.

Though not depicted in FIG. 3A, each cavity (e.g., 212) may include an acoustic treatment, such as a surface treatment, or material placed within the cavity, which may further attenuate sound and increase the overall sound mitigation of the acoustic fairing assembly.

FIG. 3B depicts fairing bodies 202A-D with face sheets 204A-D attached. The set of fairing bodies 202A-D and the attached face sheets 204A-D may be referred to collectively as a fairing assembly.

As depicted, the face sheets 204A-D are perforated. In some embodiments, the characteristics of the perforations may be tuned based on sound characteristics of the engine. Generally, the perforations allow sound waves to enter, where they reflect off the back of the fairing body, reflect off walls 214, and interact with further entering sound waves that are out of phase. This out of phase interaction causes destructive interference and thereby mitigates sound.

The perforations in face sheets 204A-D may be tuned by changing the size of each perforation opening as well as the distribution or pattern of perforations in a given area. For example, as uniformly distributed perforations are made larger in a given area, the total percentage of "open" area in the given area increases.

Though not depicted in FIG. 3B, the characteristics of the perforations may vary in different portions or zones of a face sheet. For example, perforations in a first area or zone towards the leading edge 216 may have a first set of characteristics (e.g., opening size, distribution, etc.) while perforations in a second area or zone toward the trailing edge 218 may have a second set of characteristics. In some embodiments, these zones may overlap, or be partially coextensive, while in others the zones may be completely separated. Generally, having different zones with different perforation characteristics may allow for tuning the acoustic performance at different portions of the inner fan duct where temperatures, cross-sections, pressures, air speeds, and the like vary based on conditions and geometries of the fan duct.

Figure 4:
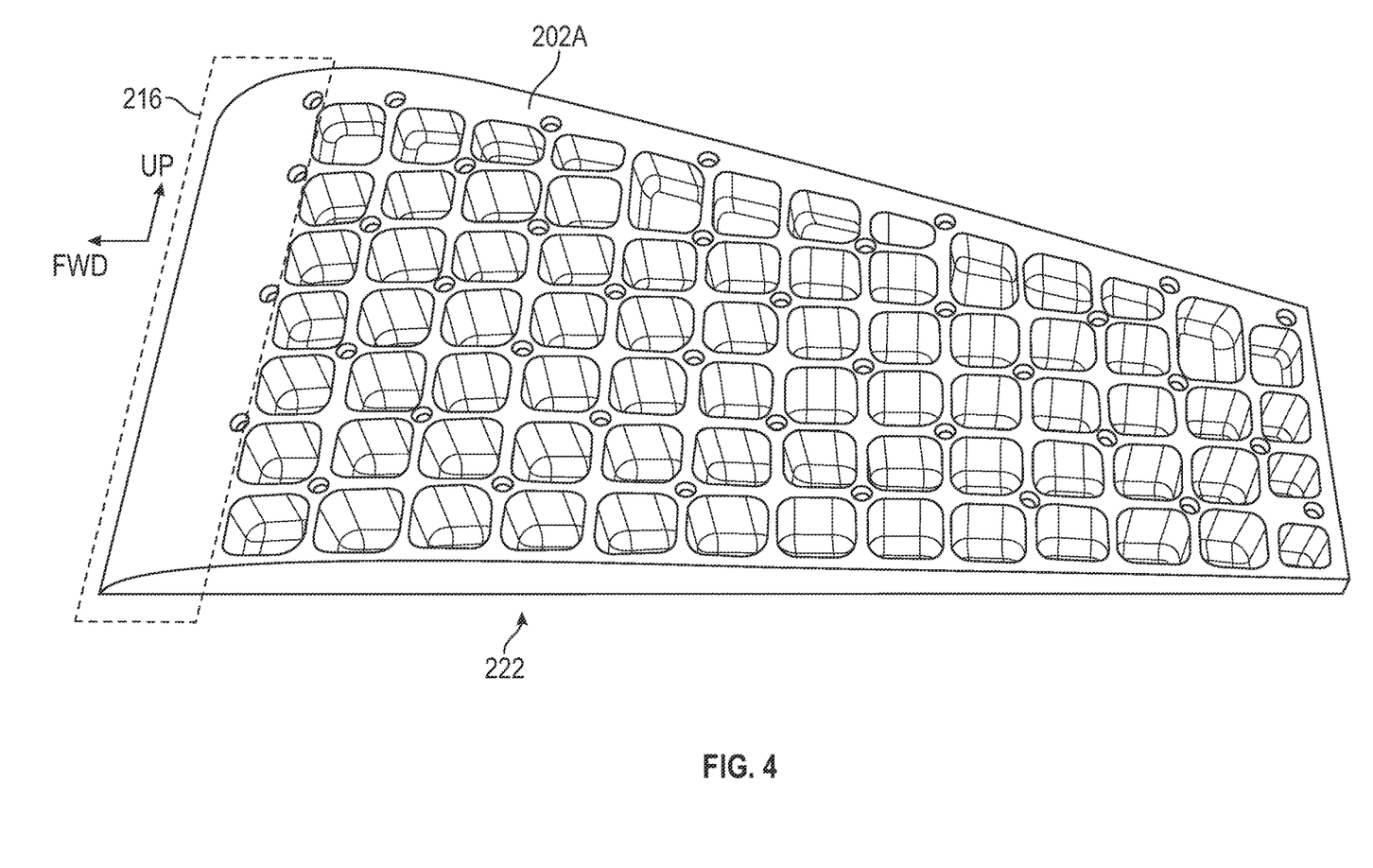
FIG. 4 depicts aspects of a fairing body of a lower acoustic fairing assembly.

FIG. 4 depicts a closer view of fairing body 202A of a lower acoustic fairing assembly, as described above with respect to FIG. 3A. In this embodiment, a back 222 of fairing body 202A (facing away from the page) may be generally flat or otherwise tailored to fit against another structure in an engine. In other embodiments, back 222 may generally have alternative surface shapes based on any other aspect to which it is attached.

Further, in this embodiment leading edge portion 216 generally does not include cavities, which may strengthen this portion of fairing body 202A against the force of gas flows through the fan duct.

Example Aspects of an Upper Acoustic Fairing Assembly

Figure 5A:
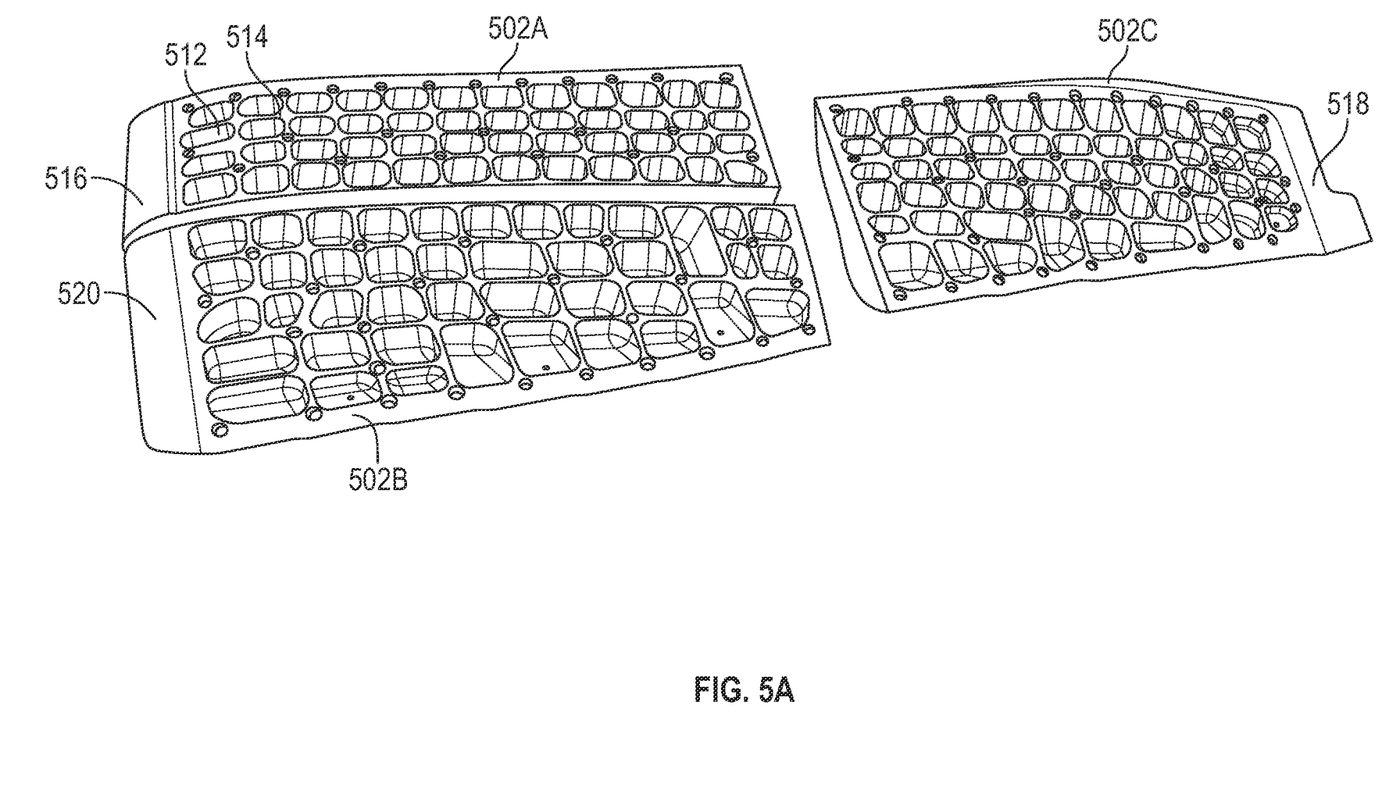
FIGS. 5A-5B depict aspects of an upper acoustic fairing assembly in an upper bifurcation area.
Figure 5B:
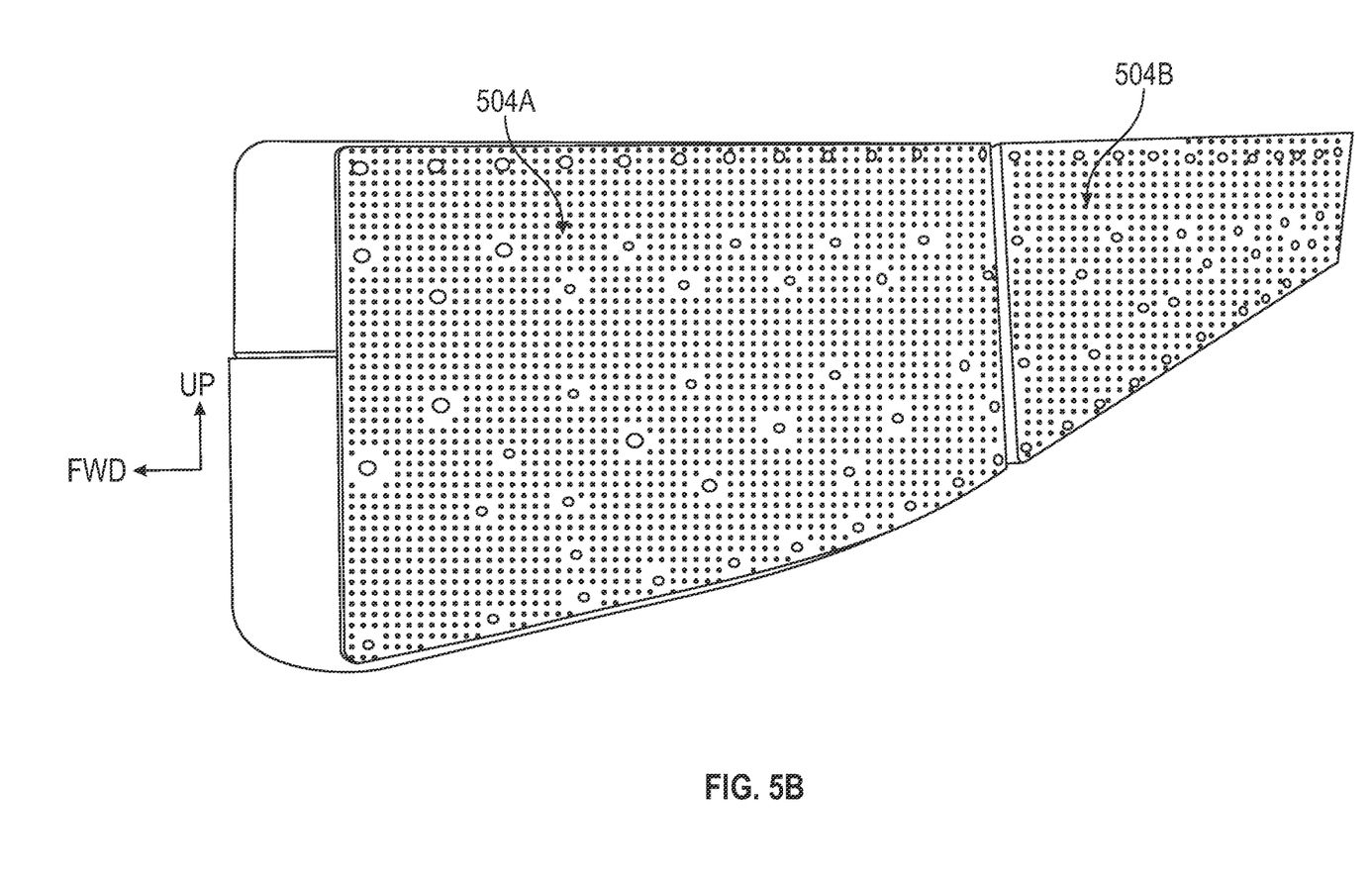

FIGS. 5A-5B depict aspects of an upper acoustic fairing assembly (e.g., upper acoustic fairing assembly 106 in FIG. 1A) in an upper bifurcation area of an engine.

In particular, FIG. 5A depicts fairing bodies 502A-C, which each include a plurality of cavities 512. Generally, the cavities are defined by walls 514. Note that while the depicted embodiment depicts cavities that generally have four walls, any number of walls and shapes of the cavities can generally be used.

As above, cavities 512 and walls 514 generally form acoustic cells, which may be tuned to perform sound cancelling and attenuation when combined with a face sheet, such as depicted in FIG. 5B. Generally, the consideration for the shape and dimensionality of cavities 512 is the same as described above with respect to cavities 212 of FIG. 3A. Fairing bodies 502A and 502B likewise include a leading edge 516, which is generally presented to the direction of flow of air through the nacelle of an engine, and which includes an aerodynamic surface to reduce drag. Fairing body 502C includes a trailing edge 518.

Fairing bodies 502A-C also include recessed portions (e.g., 520), or ledges, offset from the outer perimeter of the fairing, which allow for fitting fairing top sheets (as depicted in FIG. 5B) in a flush manner, which beneficially reduces drag.

In the depicted embodiment, fairing bodies 502A-C are formed as separate pieces of an acoustic fairing assembly for the same reasons as described above with respect to FIG. 3A.

As above, cavities 512 may include an acoustic treatment, such as a surface treatment, or material placed within the cavity, which may further attenuate sound and increase the overall sound mitigation of the acoustic fairing assembly.

FIG. 5B depicts fairing bodies 502A-C with face sheets 504A-B attached. As above, the set of fairing bodies 502A-C and the attached face sheets 504A-C may be referred to collectively as a fairing assembly.

Note that unlike FIG. 3B, wherein each fairing body included its own face sheet, in this embodiment, fairing bodies 502A-B are covered by one face sheet, and fairing body 502C is covered by a separate face sheet. In other embodiments, a single face sheet may be used to cover all of the fairing bodies of a given fairing assembly.

As above, face sheets 504A-B are perforated, and may have different characteristics along their dimensions for tuning acoustic performance.

Figure 6:
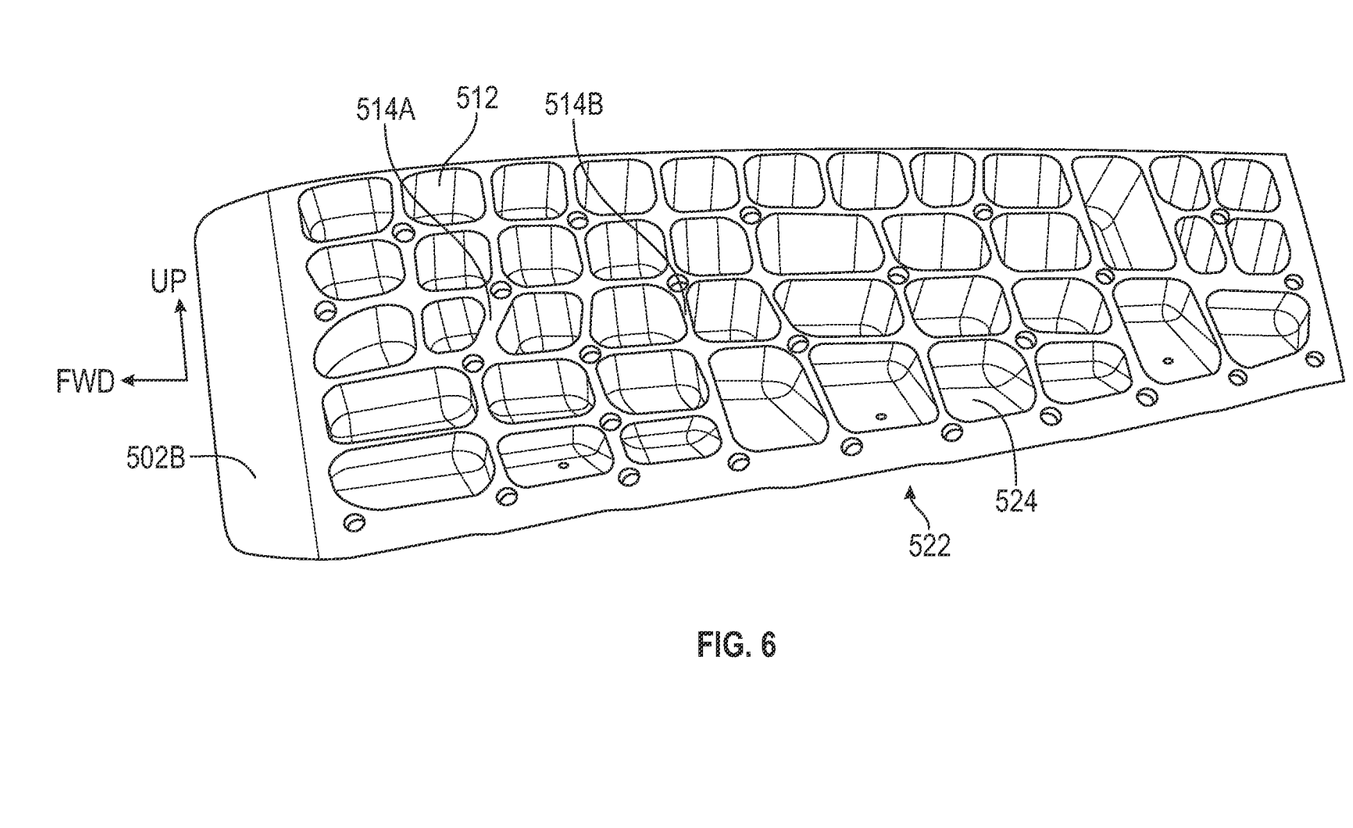
FIG. 6 depicts aspects of a fairing body of an upper acoustic fairing assembly.

FIG. 6 depicts a closer view of fairing body 502B of FIG. 5A. Notably, the various cavities (e.g., 512) can have different shapes and different depths, which allows for attenuating different frequencies of sound. In this embodiment, a back 522 of fairing body 502B (facing away from the page) may be generally flat. Further, the shapes of the cavities and cavity walls, including the width of the cavity walls, may be adjusted for structural considerations. For example, fairing body 502B includes relatively thicker cavity walls (e.g., 514A) as well as relatively thinner cavity walls (e.g., 514B).

Further, in some cases a cavity may have fewer walls. For example, cavity 524 has only three walls due to narrowing depth in that portion of the fairing body.

Example Clauses

Implementation examples are described in the following numbered clauses:

Clause 1: A nacelle for an engine, comprising: a plurality of acoustic fairing assemblies disposed within an aft fan duct of the nacelle, wherein each acoustic fairing assembly of the plurality of acoustic fairing assemblies comprises: a fairing body comprising a plurality of acoustic cells; and a fairing face sheet comprising a plurality of perforations and configured to be attached to the fairing body.

Clause 2: The nacelle of Clause 1, wherein at least a subset of the plurality of acoustic cells comprises a cell depth dimension larger than a maximum cell opening width dimension.

Clause 3: The nacelle of any one of Clauses 1 or 2, wherein at least a subset of the plurality of acoustic cells comprises a cell cavity comprising an acoustic treatment.

Clause 4: The nacelle of any one of Clauses 1-3, wherein at least a first subset of the plurality of acoustic cells comprises a cross-sectional shape different than a cross-sectional shape of a second subset of the plurality of acoustic cells.

Clause 5: The nacelle of any one of Clauses 1-4, wherein: each acoustic fairing assembly of the plurality of acoustic fairing assemblies comprises a plurality of fairing bodies, and the plurality of fairing bodies are assembled within the acoustic fairing assembly and configured to allow thermal expansion and contraction.

Clause 6: The nacelle of Clause 5, wherein: each fairing assembly comprises at least one fairing body of the plurality of fairing bodies that comprises a leading edge portion comprising an aerodynamic surface, and the leading edge portion comprises no acoustic cells.

Clause 7: The nacelle of Clause 5, wherein each fairing body of the plurality of fairing bodies comprises an individual fairing face sheet.

Clause 8: The nacelle of Clause 5, wherein at least two fairing bodies of the plurality of fairing bodies share a fairing face sheet.

Clause 9: The nacelle of any one of Clauses 1-8, wherein the fairing body further comprises a recessed portion configured for receiving the fairing face sheet.

Clause 10: The nacelle of any one of Clauses 1-9 wherein the fairing body further comprises a plurality of attachment points configured for attaching to the fairing face sheet.

Clause 11: The nacelle of any one of Clauses 1-10, wherein the plurality of perforations comprises at least: a first subset of perforations having a first opening dimension, a second subset of perforations having a second opening dimension, and the first opening dimension is larger than the second opening dimension.

Clause 12: The nacelle of any one of Clauses 1-10, wherein the plurality of perforations comprises at least: a first subset of perforations having a first spacing dimension, a second subset of perforations having a second spacing dimension, and the first spacing dimension is larger than the second spacing dimension.

Clause 13: The nacelle of any one of Clauses 11 or 12, wherein: the first subset of perforations is positioned towards a leading edge of the fairing body, the second subset of perforations is positioned towards a trailing edge of the fairing body.

Clause 14: The nacelle of Clause 13, wherein the first subset of perforations is not coextensive with the second subset of perforations.

Clause 15: The nacelle of any one of Clauses 1-14, wherein the fairing body is formed of at least one of: a metallic material; a composite material; a polymer-based material; or a fiber-reinforced material.

Clause 16: The nacelle of any one of Clauses 1-15, wherein: the plurality of acoustic fairing assemblies comprise at least: a first plurality of upper acoustic fairing assemblies connected between a first nacelle beam and an inner wall of a thrust reverser assembly; and a second plurality of lower acoustic fairing assemblies connected between the inner wall of the thrust reverser assembly and a second nacelle beam.

Clause 17: The nacelle of any one of Clauses 1-16, wherein the aft fan duct of the nacelle comprises at least a portion of a thrust reversing system of the engine.

Clause 18: An aircraft comprising a nacelle according to any one of Clauses 1-17.

Clause 19: A method of manufacturing, comprising installing a nacelle according to any one of Clauses 1-17 on an aircraft.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A nacelle for an engine, comprising:
a plurality of acoustic fairing assemblies disposed within an aft fan duct of the nacelle, wherein the aft fan duct is between an inner fan duct wall and an outer fan duct wall,
wherein each acoustic fairing assembly of the plurality of acoustic fairing assemblies comprises:
a fairing body comprising a plurality of acoustic cells; and
a fairing face sheet comprising a plurality of perforations and configured to be attached to the fairing body.

2. The nacelle of claim 1, wherein at least a subset of the plurality of acoustic cells comprises a cell depth dimension larger than a maximum cell opening width dimension.

3. The nacelle of claim 1, wherein at least a subset of the plurality of acoustic cells comprises a cell cavity comprising an acoustic treatment.

4. The nacelle of claim 1, wherein at least a first subset of the plurality of acoustic cells comprises a cross-sectional shape different than a cross-sectional shape of a second subset of the plurality of acoustic cells.

5. The nacelle of claim 1, wherein:
each acoustic fairing assembly of the plurality of acoustic fairing assemblies comprises a plurality of fairing bodies, and
the plurality of fairing bodies are assembled within the acoustic fairing assembly and configured to allow thermal expansion and contraction.

6. The nacelle of claim 5, wherein:
each fairing assembly comprises at least one fairing body of the plurality of fairing bodies that comprises a leading edge portion comprising an aerodynamic surface, and
the leading edge portion comprises no acoustic cells.

7. The nacelle of claim 5, wherein each fairing body of the plurality of fairing bodies comprises an individual fairing face sheet.

8. The nacelle of claim 5, wherein at least two fairing bodies of the plurality of fairing bodies share a fairing face sheet.

9. The nacelle of claim 1, wherein the fairing body further comprises a recessed portion configured for receiving the fairing face sheet.

10. The nacelle of claim 1, wherein the fairing body further comprises a plurality of attachment points configured for attaching to the fairing face sheet.

11. The nacelle of claim 1, wherein the plurality of perforations comprises at least:
a first subset of perforations having a first opening dimension,
a second subset of perforations having a second opening dimension, and
the first opening dimension is larger than the second opening dimension.

12. The nacelle of claim 1, wherein the plurality of perforations comprises at least:
a first subset of perforations having a first spacing dimension,
a second subset of perforations having a second spacing dimension, and
the first spacing dimension is larger than the second spacing dimension.

13. The nacelle of any one of claim 11 or 12, wherein:
the first subset of perforations is positioned towards a leading edge of the fairing body,
the second subset of perforations is positioned towards a trailing edge of the fairing body.

14. The nacelle of claim 13, wherein the first subset of perforations is not coextensive with the second subset of perforations.

15. The nacelle of claim 1, wherein the fairing body is formed of at least one of:
a metallic material;
a composite material;
a polymer-based material; or
a fiber-reinforced material.

16. The nacelle of claim 1, wherein:
the plurality of acoustic fairing assemblies comprise at least:
a first plurality of upper acoustic fairing assemblies connected between a first nacelle beam and an inner wall of a thrust reverser assembly; and
a second plurality of lower acoustic fairing assemblies connected between the inner wall of the thrust reverser assembly and a second nacelle beam.

17. The nacelle of claim 1, wherein the aft fan duct of the nacelle comprises at least a portion of a thrust reversing system of the engine.

18. An aircraft comprising a nacelle, wherein:
the nacelle comprises a plurality of acoustic fairing assemblies disposed within an aft fan duct of the nacelle, wherein the aft fan duct is between an inner fan duct wall and an outer fan duct wall, and
each acoustic fairing assembly of the plurality of acoustic fairing assemblies comprises:
a fairing body comprising a plurality of acoustic cells; and
a fairing face sheet comprising a plurality of perforations and configured to be attached to the fairing body.

19. The aircraft of claim 18, wherein each acoustic fairing assembly of the plurality of acoustic fairing assemblies comprises a plurality of fairing bodies.

20. A method, comprising:
installing a nacelle on an aircraft, wherein:
the nacelle comprises a plurality of acoustic fairing assemblies disposed within an aft fan duct of the nacelle, wherein the aft fan duct is between an inner fan duct wall and an outer fan duct wall, and
each acoustic fairing assembly of the plurality of acoustic fairing assemblies comprises:
a fairing body comprising a plurality of acoustic cells; and
a fairing face sheet comprising a plurality of perforations and configured to be attached to the fairing body.

* * * * *